(12) United States Patent
Suita

(10) Patent No.: US 9,469,159 B2
(45) Date of Patent: Oct. 18, 2016

(54) PNEUMATIC TIRE

(75) Inventor: Harunobu Suita, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 1087 days.

(21) Appl. No.: 13/596,517

(22) Filed: Aug. 28, 2012

(65) Prior Publication Data

US 2013/0068359 A1    Mar. 21, 2013

(30) Foreign Application Priority Data

Sep. 20, 2011 (JP) ................ 2011-204648

(51) Int. Cl.
| | | |
|---|---|---|
| B60C 11/13 | (2006.01) | |
| B60C 11/01 | (2006.01) | |
| B60C 11/03 | (2006.01) | |

(52) U.S. Cl.
CPC .......... *B60C 11/01* (2013.01); *B60C 11/0302* (2013.04); *B60C 11/0309* (2013.04); *B60C 11/1323* (2013.04); *B60C 2011/0346* (2013.04); *B60C 2011/1338* (2013.04)

(58) Field of Classification Search
CPC .......... B60C 11/1323; B60C 11/1307; B60C 11/1353; B60C 11/1376; B60C 11/1384; B60C 11/1392; B60C 11/13; B60C 11/01; B60C 2011/1138; B60C 2011/1361; B60C 2011/0346; B60C 11/0302; B60C 11/0309; B60C 11/11; B60C 11/03; B60C 11/0306
USPC .................................................... 152/209.21
IPC ...................................................... B60C 11/13
See application file for complete search history.

(56) References Cited

U.S. PATENT DOCUMENTS

| | | |
|---|---|---|
| 6,220,322 B1 | 4/2001 | Matsuura |
| 2005/0126670 A1 | 6/2005 | Godefroid |

FOREIGN PATENT DOCUMENTS

| | | |
|---|---|---|
| CN | 1626368 A | 6/2005 |
| EP | 2 540 525 A1 | 1/2013 |

(Continued)

OTHER PUBLICATIONS

Office Action dated Jun. 26, 2014, issued in corresponding Chinese Patent Application No. 201210232487.7, with English Translation (16 pages).

(Continued)

*Primary Examiner* — Michael H Wilson
*Assistant Examiner* — Philip N Schwartz
(74) *Attorney, Agent, or Firm* — Westerman, Hattori, Daniels & Adrian, LLP

(57) ABSTRACT

A shoulder main groove has a plurality of circumferential components inclined to an inside in a tire width direction toward a forward in a tire rotating direction. The circumferential components are communicated with each other via a lateral groove. A shoulder block row includes a first block positioned in a rear side in the tire rotating direction of the circumferential component, and a second block which has a smaller area of a top surface than the first block, and is adjacent to the first block with the lateral groove sandwiched therebetween. A plurality of projections elevating from a groove bottom and protruding out of a side wall of the second block are provided. A volume of the projection positioned in a trailing side of the second block is larger than a volume of the projection positioned in a leading side.

8 Claims, 14 Drawing Sheets

(56) References Cited

FOREIGN PATENT DOCUMENTS

| JP | 02241805 A | * | 9/1990 | ............. B60C 11/11 |
|----|------------|---|--------|--------------------------|
| JP | 11-227419 A | | 8/1999 | |
| JP | 2003-154812 A | | 5/2003 | |
| JP | 2004-276861 A | | 10/2004 | |
| JP | 2005-088670 A | | 4/2005 | |
| JP | 2006-298202 A | | 11/2006 | |
| JP | 2007-320539 A | | 12/2007 | |
| JP | 2010-274695 A | | 12/2010 | |
| WO | 2011/102264 A1 | | 8/2011 | |

OTHER PUBLICATIONS

Chinese Office Action dated Feb. 15, 2015, issued in corresponding CN Patent Application No. 201210232487.7 with English translation (18 pages).

Office Action dated Jun. 19, 2015, issued in counterpart Japanese Patent Application No. 2011-204648, with English translation (4 pages).

\* cited by examiner (Comparative example 1)

(a)

(b)

(Comparative example 2)

(a)

(b)

(Comparative example 3)

(a)

(b)

(Comparative example 4)

(a)

(b)

(a)

(b)

(a)

(b)

(a)

(b)

PNEUMATIC TIRE

BACKGROUND OF THE INVENTION

1. Field of the Invention

The present invention relates to a pneumatic tire in which a tread surface is provided with a plurality of main grooves which extend in a tire circumferential direction, and a shoulder block row which is arranged in an outer side in a tire width direction of a shoulder main groove positioned in an outermost side in the tire width direction in the main grooves.

2. Description of the Related Art

There has been known a structure in which an outer side in a tire width direction of a shoulder main groove is provided with a shoulder block row formed by arranging a plurality of blocks in a tire circumferential direction. Generally, an outer diameter is smaller in both end sides of a tread surface than in a center, and the block tends to generate a slip in the shoulder block row due to the diameter difference. Particularly, since a trailing side portion of the block elastically deforms largely in a tire circumferential direction at a time of grounding, a slip amount becomes large. As a result, the trailing side portion of the block wears by priority, and an irregular wear called as a heel and toe wear is generated.

Further, in the case where a shoulder main groove 10 is inclined such as FIG. 7, the heel and toe wear has been significant in a block 3 which constructs a shoulder block row 4. The inventor of the present invention has made a study of this, and has found that a slip direction of a main groove side portion of the block 3 changes and a slip amount becomes large, from a leading side (a forward side of a tire rotating direction R) thereof toward a trailing side (a rear side of the tire rotating direction R). FIG. 7 shows a direction and a magnitude of the slip by arrows, and a region in which the wear becomes significant is colored by black.

The phenomenon mentioned above becomes significant in the small block 3 which is adjacent to the leading side of the relatively larger block 2. This can be thought to be caused by a fact that a friction energy is lower in the leading side portion of the block 2, the friction energy is higher in the trailing side portion of the block 3, and an energy difference is large, in the shoulder block row 4. The friction energy in this case is a sum of a friction energy in a tire circumferential direction and a friction energy in a tire width direction, and these friction energies come to a product of a stress in each of the directions and a slip amount.

Patent Document 1 and Patent Document 2 describe a pneumatic tire in which a block constructing a shoulder block row is connected to a block positioned in an inner side in a tire width direction by a protrusion portion which is provided in a groove bottom of a shoulder main groove. Further, Patent Document 3 describes a pneumatic tire in which a shoulder rib provided with a lug groove open in a shoulder main groove is provided with a convex portion which reinforces a side wall of a portion partitioned by the lug groove entirely.

However, in the case where the protrusion portion or the convex portion as mentioned above are applied to the block 3 in FIG. 7, a slip direction of the main groove side portion of the block 3 moves to an outer side in a tire width direction (a left side in FIG. 7) while heading for the trailing side. In accordance with this, such as an example mentioned later, the region in which the wear becomes significant is somewhat reduced, however, the trailing side portion of the block 3 wears widely and the heel and toe wear is generated. Further, since the protrusion portion and the convex portion as mentioned above comes to an obstacle for drainage by the shoulder main groove, causing a deterioration of a drainage performance.

Patent Document 4 describes a pneumatic tire in which a reinforcing portion which goes beyond a center line of a main groove is provided in an end portion in a circumferential direction of a block which constructs a shoulder block row. However, even if the reinforcing portion mentioned above is provided in the trailing side of the block 3 in FIG. 7, a slip amount does not change in a leading side and a center in the main groove side portion of the block 3. Accordingly, it is impossible to sufficiently suppress a heel and toe wear.

PRIOR ART DOCUMENTS

Patent Document 1: Japanese Unexamined Patent Publication No. 2005-88670
Patent Document 2: Japanese Unexamined Patent Publication No. 11-227419
Patent Document 3: Japanese Unexamined Patent Publication No. 2007-320539
Patent Document 4: Japanese Unexamined Patent Publication No. 2003-154812

SUMMARY OF THE INVENTION

The present invention is made by taking the actual condition mentioned above into consideration, and an object of the present invention is to provide a pneumatic tire which can prevent a heel and toe wear of a block which constructs a shoulder block row, while suppressing a deterioration of a drainage performance.

The object can be achieved by the following present invention. That is, the present invention provides a pneumatic tire comprising a plurality of main grooves which extend in a tire circumferential direction, a shoulder block row which is arranged in an outer side in a tire width direction of a shoulder main groove which is positioned in an outermost side in the tire width direction among the main grooves, and a tread surface which is provided with a plurality of main grooves and the shoulder block row, wherein the shoulder main groove has a plurality of circumferential components which are inclined to an inner side in the tire width direction toward a forward in a tire rotating direction, and the circumferential components which are adjacent in the tire circumferential direction are communicated with each other via a lateral groove, wherein the shoulder block row includes a first block which is positioned in a rear side in the tire rotating direction of the circumferential component, and a second block which has a smaller area of a top surface than the first block, and is adjacent to the first block in the tire circumferential direction with the lateral groove sandwiched therebetween, and wherein a plurality of projections which are elevated from a groove bottom of the shoulder main groove and protruding out of a side wall of the second block are provided so as to be spaced at a distance in the tire circumferential direction, and a volume of the projection which is positioned in a trailing side of the second block is larger than a volume of the projection which is positioned in a leading side.

The pneumatic tire is provided in the tread surface with the shoulder main groove and the shoulder block row as mentioned above, and the heel and toe wear tends to be generated particularly in the second block in the block which constructs the shoulder block row. Accordingly, in the present invention, a plurality of projections which are elevated from the groove bottom of the shoulder main groove and protrude from the side wall of the second block are provided so as to be spaced at the distance in the tire circumferential direction, and a volume of the projections is made larger in the trailing side than in the leading side. In accordance with this, it is possible to suppress a change in the slip direction of the shoulder main groove side portion of the second block and make the slip amount small, thereby preventing the heel and toe wear.

Further, in the pneumatic tire, since a plurality of projections are provided so as to be spaced at the distance in the tire circumferential direction, it is possible to suppress the volumetric capacity reduction of the shoulder main groove due to the projections, thereby suppressing the deterioration of the drainage performance. Further, since the slip of the block is suppressed, and a rigidity of the block is enhanced by setting a plurality of projections, it is possible to improve a steering stability.

In the present invention, it is preferable that the number of the projections which are provided in the side wall of the second block is three or four, and the volume of the projection becomes larger toward the trailing side of the second block. In accordance with this, in the side wall of the second block, the relatively larger projection is provided in the trailing side, the relatively smaller projection is provided in the leading side, and the projection having the intermediate size is provided in the center. Therefore, it is possible to accurately achieve the effect of suppressing the change of the slip direction of the shoulder main groove side portion of the second block and making the slip amount small, thereby effectively preventing the heel and toe wear.

In the present invention, it is preferable that the projection is formed such that a protruding amount from the side wall becomes larger toward the trailing side of the second block. In accordance with the structure mentioned above, it is advantageous for suppressing the slip of the shoulder main groove side portion of the second block in which the slip amount tends to become larger toward the trailing side. Further, it is effective for suppressing the deterioration of the drainage performance. As a preferable embodiment in this case, there can be exemplified a structure in which the projection is formed as a triangular shape or a step shape in a plan view.

In the present invention, it is preferable that all the projections which are provided in the side wall of the second block are settled within a region surrounded by a first imaginary straight line which connects a corner portion in the leading side of the first block to a corner portion in the trailing side of the second block facing the shoulder main groove, through the lateral groove, a second imaginary straight line which extends in the tire circumferential direction from the corner portion in the leading side of the secondblock facing the shoulder main groove toward a rear in the tire rotating direction, and a side wall of the second block facing the shoulder main groove. Accordingly, it is possible to effectively suppress the deterioration of the drainage performance.

In the present invention, it is preferable that the projection positioned in the trailing side of the second block is provided in a corner portion in the trailing side of the second block along an extending direction of the side wall of the second block facing to the lateral groove. In accordance with the structure mentioned above, it is advantageous for suppressing the slip of the shoulder main groove side portion of the second block in which the slip amount tends to become larger in the trailing side.

DETAILED DESCRIPTION OF THE PREFERRED EMBODIMENTS

Figure 1:
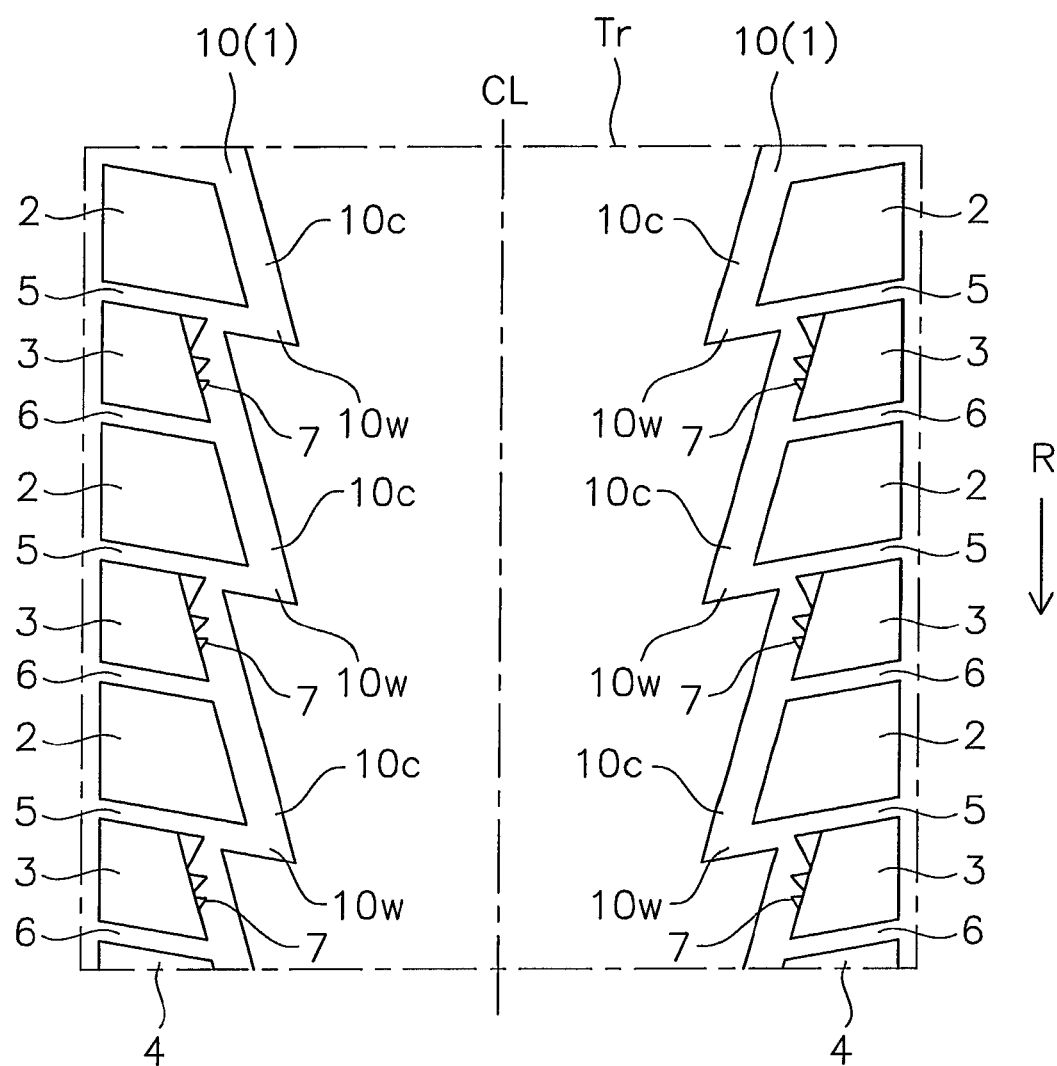
FIG. 1 is an expansion plan view showing one example of a substantial part of a tread surface of a pneumatic tire in accordance with the present invention.

An embodiment of the present invention will be explained with reference to the drawings. As shown in FIG. 1, in a pneumatic tire of the present embodiment, a plurality of main grooves 1 which extend in a tire circumferential direction, and a shoulder block row 4 which is arranged in an outer side in a tire width direction of a shoulder main groove 10 positioned in an outermost side in the tire width direction in the main grooves 1 are arranged on a tread surface Tr. In the present embodiment, the shoulder block row 4 is provided in both sides in the tire width direction, however, may be provided only in one side. An arrow R denotes a tire rotating direction.

In FIG. 1, a description of a tread pattern is omitted in a center region which comes to an intermediate of a pair of shoulder main grooves 10 with a tire equator CL sandwiched therebetween, however, an aspect of the center region is not particularly limited, but various patterns can be applied thereto. In other words, in the center region, a groove portion including the other main grooves, and a land portion constructed by a rib or a block row can be appropriately provided.

The shoulder main groove 10 has a plurality of circumferential components 10c which are inclined to an inner side in a tire width direction toward a forward (a lower side in FIG. 1) of a tire rotating direction R, and the circumferential components 10c which are adjacent in the tire circumferential direction are communicated with each other via a lateral groove 5. The lateral groove 5 cuts across the shoulder block row 4 and partitions the block 2 and the block 3 in the tire circumferential direction. The shoulder main groove 10 is structured by alternately repeating the circumferential component 10*c* and a widthwise component 10*w* constructed by a part of the lateral groove 5, and is formed in a zigzag manner as a whole.

An angle θ1 of inclination with respect to the tire circumferential direction of the circumferential component 10*c* is set, for example, to 5 to 25 degree. An angle θ2 of inclination with respect to the tire width direction of the widthwise component 10*w* is set, for example, to 0 to 25 degree. The angles of inclination are defined on the basis of a groove center line of the shoulder main groove 10 which is shown by a single dot chain line in FIG. 2. In the present embodiment, the circumferential component 10*c* is longer than the widthwise component 10*w* on the basis of the groove center line of the shoulder main groove 10, and both the components extend linearly.

The shoulder block row 4 is constructed by a plurality of blocks which are arranged in the tire circumferential direction. In this tread surface Tr, the shoulder block row 4 includes a first block 2 (hereinafter, refer to as a block 2) which is positioned in a rear side of the tire rotating direction R of the circumferential component 10*c*, and a second block 3 (hereinafter, refer to as a block 3) which has a smaller area of a top surface than that of the block 2 and is adjacent in the tire circumferential direction to the block 2 with the lateral groove 5 sandwiched therebetween.

In the shoulder block row 4, there is employed a repeated pattern in the tire circumferential direction in which a pair of the block 2 and the block 3 is set to a unit, and the blocks 2 and the blocks 3 are alternately arranged in the tire circumferential direction. Further, in the shoulder block row 4, there are formed the lateral groove 5 which partitions a trailing side of the block 3, and a lateral groove 6 which partitions a leading side of the block 3 alternately in the tire circumferential direction. The block 3 is adjacent to the leading side of the block 2, however, a block different from the block 3 may be adjacent to the trailing side of the block 2.

Figure 7:
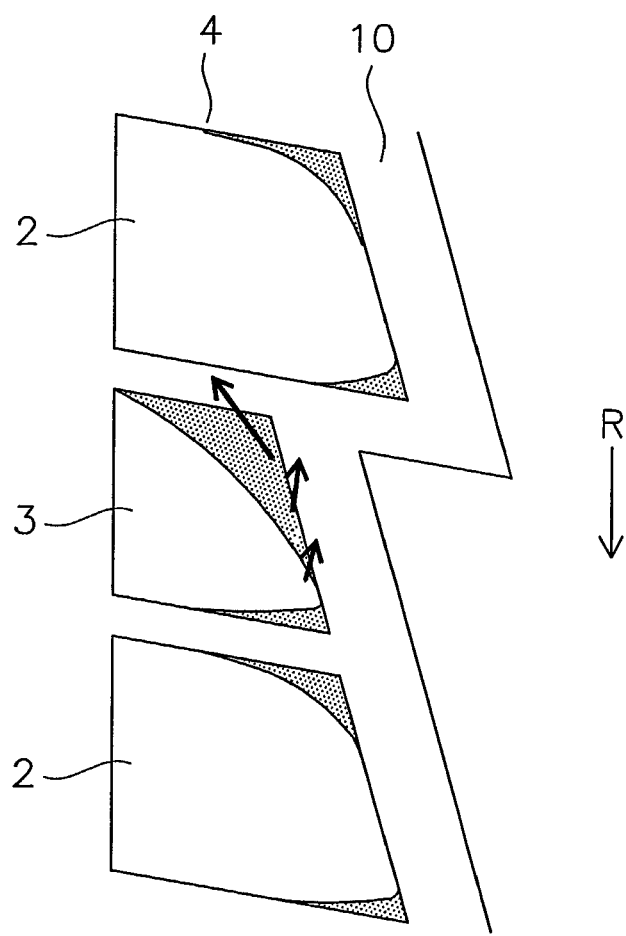
FIG. 7 is a plan view showing a shoulder block row in accordance with a comparative example 1.

In the shoulder block row 4 mentioned above, since a moment of rotation acts on the block 3 in accordance with a tire rolling, and a slip of the main groove side portion is generated as shown in FIG. 7, the heel and toe wear tends to be generated in the block 3. The slip is generated in the trailing side portion of the block 3 (the lateral groove 5 side portion) and the leading side portion (the lateral groove 6 side portion), however, since an amount of slip is smaller in comparison with the main groove side portion (the shoulder main groove 10 side portion), it becomes important for preventing the heel and toe wear to suppress the slip of the main groove side portion.

Figure 2:
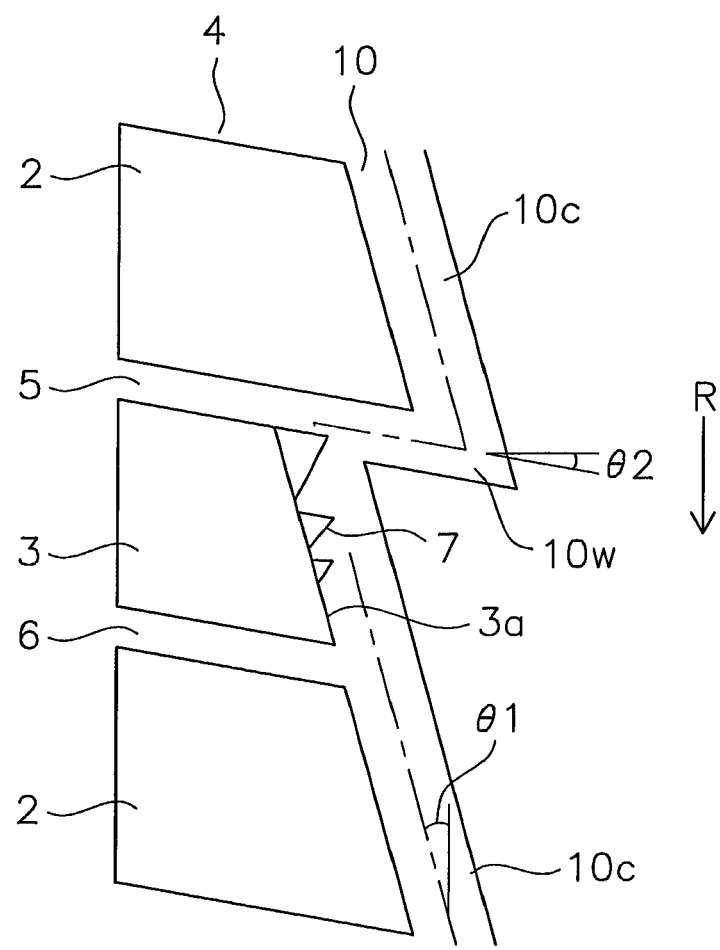
FIG. 2 is an enlarged view showing the substantial part of the tread surface in FIG. 1.
Figure 3:
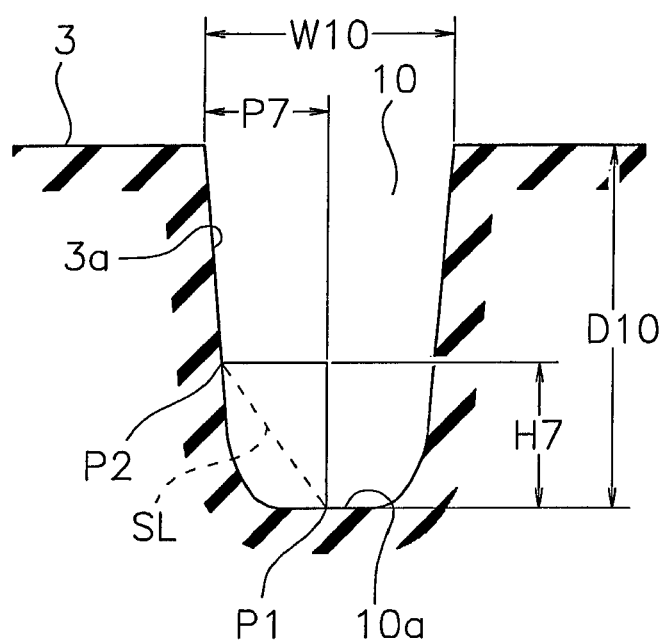
FIG. 3 is a cross sectional view along a groove width direction of a shoulder main groove.

Accordingly, as shown in FIGS. 2 and 3, a plurality of projections 7 which are elevated from a groove bottom 10*a* of the shoulder main groove 10 and protrude out of the side wall 3*a* of the block 3 are provided so as to be spaced at a distance in a tire circumferential direction. In the present embodiment, three projections 7*a*, 7*b* and 7*c* are provided in the side wall 3*a* of the block 3, and a volume of the projection 7*a* which is positioned in a trailing side of the block 3 among them is set to be larger than a volume of the projection 7*c* which is positioned in a leading side. In accordance with this, it is possible to suppress a change in the slip direction of the main groove side portion of the block 3 and make the slip amount small, thereby preventing the heel and toe wear.

Further, since a plurality of projections 7 are provided in the side wall 3*a* of the block 3 so as to be spaced at a distance in the tire circumferential direction, it is possible to suppress a volumetric capacity reduction of the shoulder main groove 10 due to the projection 7, thereby suppressing a deterioration of a drainage performance. On the contrary, in the case of being provided with a large projection which entirely reinforces the side wall 3*a* of the block 3, the projection tends to hinder a drainage through the shoulder main groove 10, causing a deterioration of the drainage performance.

In the present embodiment, the volume of the projection is larger in the order of the projection 7*a*, the projection 7*b* and the projection 7*c*. As mentioned above, it is preferable that the number of the projections 7 provided in the side wall 3*a* of the block 3 is set to three or four, and the volume of the projection 7 is made larger toward the trailing side of the block 3, thereby effectively preventing the heel and toe wear. If the number of the projections 7 is two, the effect of suppressing the slip of the block 3 becomes smaller, and if the number of the projections 7 is equal to or more than five, there is a tendency that it becomes hard to set the projections so as to be spaced at the distance while securing a size of each of the projections.

In order to set a difference in the volume of the projection 7, in addition to the differentiation of the size in a plan view such as the present embodiment, there can be thought that a height of the projections is differentiated, and a combination thereof. In the present invention, any of them may be employed.

It is preferable that a protruding amount P7 of the projection 7 with an outer edge of the side wall 3*a* of the block 3 as a reference is within 45 to 80% of a groove width W10 of the shoulder main groove 10. Since the rate is equal to or more than 45%, it is possible to appropriately reinforce the side wall 3*a* of the block 3, thereby suppressing the slip of the main groove side portion. Further, since the rate is equal to or less than 80%, the projection 7 does not protrude too much, thereby appropriately suppressing the deterioration of the drainage performance. The protruding amount P7 is defined by a maximum value per the projection 7.

It is preferable that a height H7 of the projection 7 with the groove bottom 10*a* of the shoulder main groove 10 as a reference is within 25 to 70% of a groove depth D10 of the shoulder main groove 10. Since the rate is equal to or more than 25%, it is possible to appropriately reinforce the side wall 3*a* of the block 3, thereby suppressing the slip of the main groove side portion. Further, since the rate is equal to or less than 70%, the projection 7 is not raised too high, thereby appropriately suppressing the deterioration of the drainage performance. The height H7 is defined by a maximum value per the projection 7.

It is preferable that the projection 7 is formed as such a shape as to go beyond a straight line SL which connects a contact point P1 with the groove bottom 10*a* of the shoulder main groove 10, and a contact point P2 with the side wall 3*a* of the block 3, as shown in FIG. 3. In accordance with this, it is possible to appropriately reinforce the side wall 3*a* of the block 3 so as to suppress the change in the slip direction of the main groove side portion and make the slip amount small, thereby well preventing the heel and toe wear.

Figure 4:
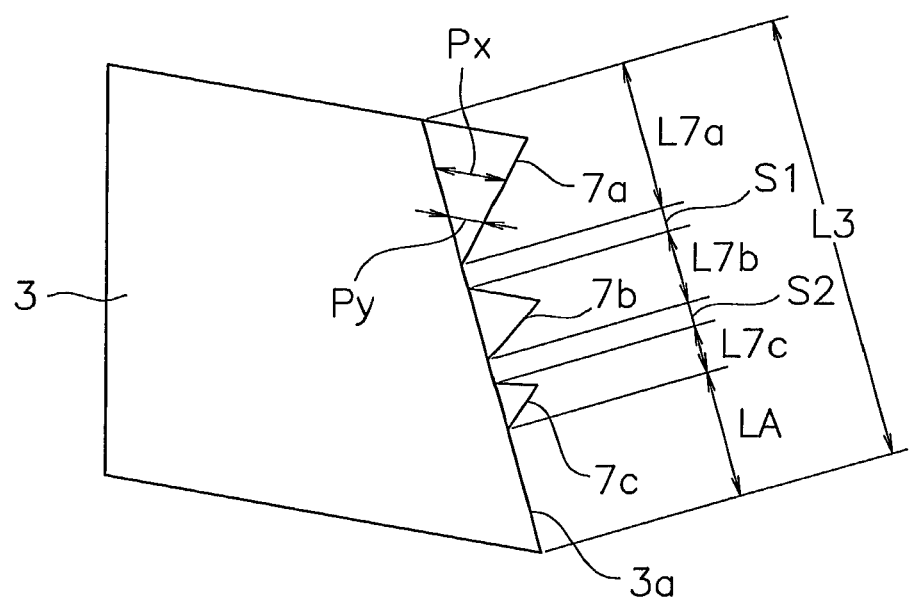
FIG. 4 is an enlarged view showing a second block.

The projection 7 in accordance with the present embodiment is formed as a triangular shape in a plan view as shown in FIG. 4, and is formed such a shape that a protruding amount from the side wall 3*a* becomes larger toward the trailing side of the block 3. In other words, a protruding amount Px in the trailing side in the projection 7 is larger than a protruding amount Py in the leading side in the projection 7. Accordingly, it is advantageous for suppressing the slip of the main groove side portion of the block 3 in which the slip amount tends to become larger toward the trailing side. Further, it is effective for suppressing the deterioration of the drainage performance.

Figure 5:
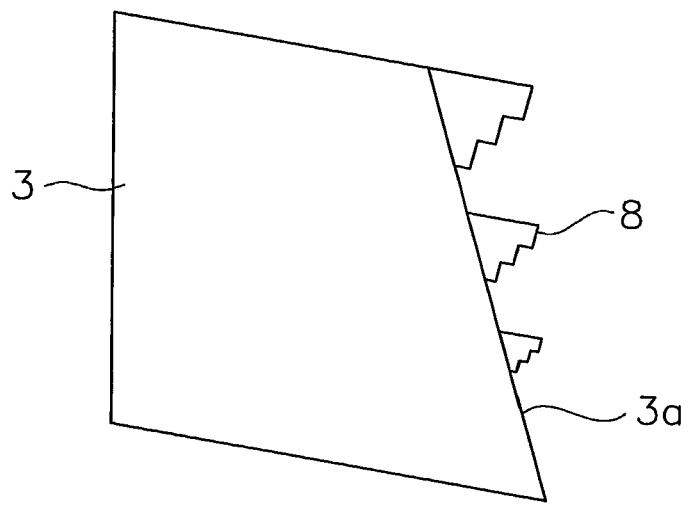
FIG. 5 is a plan view showing projections in accordance with the other embodiment of the present invention.

As the other example on the basis of the viewpoint mentioned above, there can be exemplified a projection 8 which is formed as a step shape in a plan view as shown in FIG. 5. This projection 8 is also formed such a shape that a protruding amount from the side wall 3a becomes larger toward the trailing side of the block 3. A step shaped surface of the projection 8 may be formed such a shape that outward or inward circular arcs are connected, in place of such a shape that angled L-shaped portions are connected as illustrated, and a radius of curvature of the circular arc is set, for example, between 0.5 and 1.5 mm. Projections having different shapes may be mixed, and the projection 7 and the projection 8 may be provided together in the side wall 3a of the block 3.

It is preferable that each of lengths of the projections 7 in the longitudinal direction of the circumferential component 10c, that is, L7a, L7b and L7c are within a range between 2 and 10 mm in FIG. 4. Since the lengths are equal to or more than 2 mm, it is possible to appropriately reinforce the side wall 3a of the block 3, thereby suppressing the slip of the main groove side portion. Further, since the lengths are equal to or less than 10 mm, a plurality of projections 7 can be easily provided so as to be spaced at the distance in the tire circumferential direction with respect to the side wall 3a of the block 3.

It is preferable that a total (L7a+L7b+L7c) of the lengths of the projections 7 is equal to or more than 40% the length L3 of the side wall 3a in the longitudinal direction of the circumferential component 10c. In accordance with this, it is possible to appropriately reinforce the side wall 3a of the block 3, thereby suppressing the slip of the main groove side portion. Further, it is preferable that the total mentioned above is equal to or less than 80% the length L3. In accordance with this, the comprehensive length of the projections 7 does not become too large, and it is possible to appropriately suppress the deterioration of the drainage performance.

It is preferable that the projection 7a positioned in the trailing side is provided in a corner portion in the trailing side of the block 3, and the length L7a is between 25 and 40% the length L3 of the side wall 3a. It is preferable that the projection 7c positioned in the leading side stays away from the region of the length LA from the corner portion in the leading side of the block 3, and the length L7c is between 5 and 20% the length L3 of the side wall 3a. The length LA is set between 5 and 50% the length L3.

It is preferable that the projection 7b positioned in the center is provided with the distances 51 and S2 between the projection 7a and the projection 7c, and the length L7b thereof is between 10 and 20% the length L3 of the side wall 3a. In addition, it is further preferable that the length L7b is set to be larger than the length L7c. Each of the distance S1 between the projection 7a and the projection 7b, and the distance S2 between the projection 7b and the projection 7c can be set between 5 and 10% the length L3 of the side wall 3a.

Figure 6:
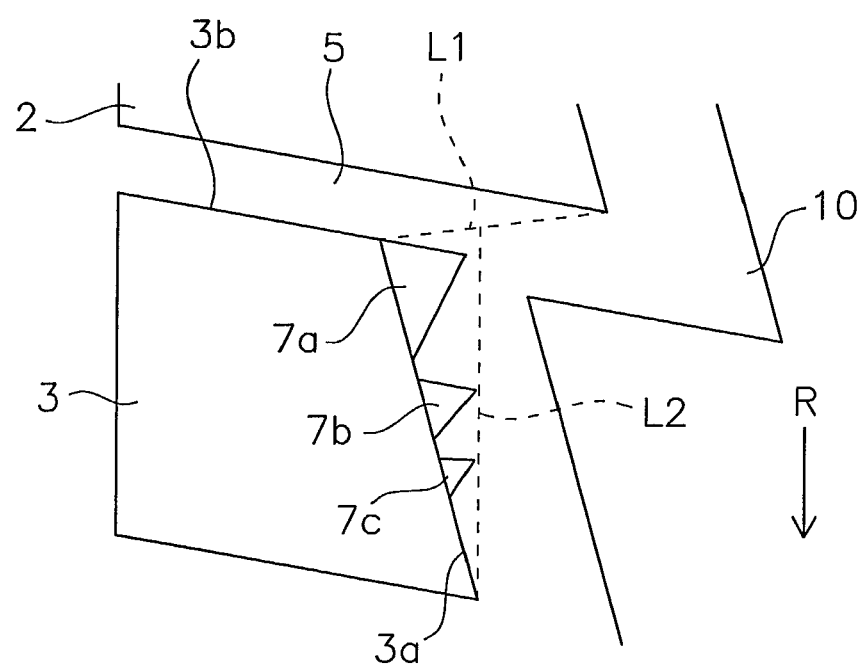
FIG. 6 is a view showing a preferable example in connection with an arranged region of the projection.

In FIG. 6, a straight line L1 is a first imaginary straight line which connects a corner portion in the leading side of the block 2 to a corner portion in the trailing side of the block 3 facing the shoulder main groove 10, through the lateral groove 5. A straight line L2 is a second imaginary straight line which extends in the tire circumferential direction from the corner portion in the leading side of the block 3 facing the shoulder main groove 10 toward a rear in the tire rotating direction R. The projections 7a to 7c provided in the side wall 3a of the block 3 are all settled within a triangular region which is surrounded by the straight line L1, the straight line L2 and the side wall 3a.

In a plurality of projections 7, the projection 7a positioned in the trailing side of the block 3 is provided in the corner portion in the trailing side of the block 3 along an extending direction of the side wall 3b of the block 3 facing the lateral groove 5. In accordance with the structure mentioned above, it is advantageous for suppressing the slip of the main groove side portion of the block 3 in which the slip amount tends to become larger in the trailing side.

In the present embodiment, there is shown an example of the pneumatic tire in which the tire rotating direction is designated to one direction, and the tire rotating direction R is designated in such a manner as to be directed as shown in FIG. 1 at a time of being installed to the vehicle. The designation mentioned above is carried out, for example, by displaying the direction of the installation to the vehicle in the side wall portion. In the case where a predetermined directional relationship can be obtained regardless of the direction of the installation, such as the case where the shoulder main groove 10 and the shoulder block row 4 shown in the right side of FIG. 1 are arranged reversely up and down, the designation mentioned above may be omitted.

In the pneumatic tire in accordance with the present invention, as long as the shoulder main groove and the shoulder block row are provided as mentioned above, the tread pattern is not particularly limited. However, taking into consideration the drainage performance, it is preferable that at least three main grooves including a pair of shoulder main grooves are formed on the tread surface.

The pneumatic tire in accordance with the present invention is the same as a normal pneumatic tire except that the shoulder main groove and shoulder block row as mentioned above are arranged in tread surface, and the known material, shape, structure, manufacturing method and the like can be applied to the present invention.

EXAMPLE

An example which concretely shows the structure and effect of the present invention will be explained. A tire to be provided for evaluation is set such that a size is 225/40R18. The tire is assembled to a rim of 18×8JJ so as to be installed to a vehicle, a pneumatic pressure is 230 kPa, and a vertical load is 4903 N.

(1) Heel and Toe Wear Resistance

After traveling for 12000 km, a worn state of a block (a second block) in which a heel and toe wear is regarded as problem was observed, and a form and an area of a region where the wear is significant was searched. The form was illustrated, and the area was expressed by a rate with respect to an area of a top surface of the block before being worn.

(2) Drainage Performance (Hydroplaning Resistance Performance)

The tire was rolled on a wet road surface having a water depth 8 mm, and a speed at a time when a hydroplaning phenomenon is generated was measured. An evaluation is carried out by an index number in the case where a result of a comparative example 1 is set to 100, and the greater numerical value indicates the more excellent performance.

(3) Steering Stability

A subjective evaluation is made on a straight going stability, a lane changing performance, a cornering performance and the like on a dry road surface by two drivers. An evaluation is carried out by an index number in the case where a result of a comparative example 1 is set to 100, and the greater numerical value indicates the more excellent performance.

Figure 8:
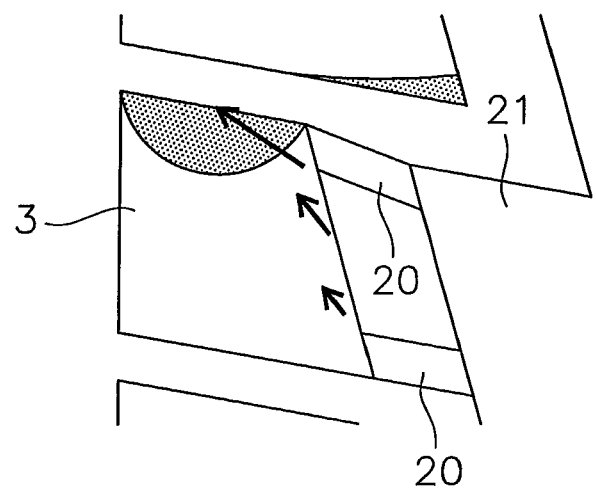
FIGS. 8(a) and 8(b) are a plan view and a side view showing a second block in accordance with a comparative example 2.
Figure 8:
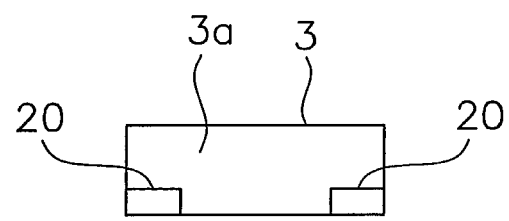
Figure 9:
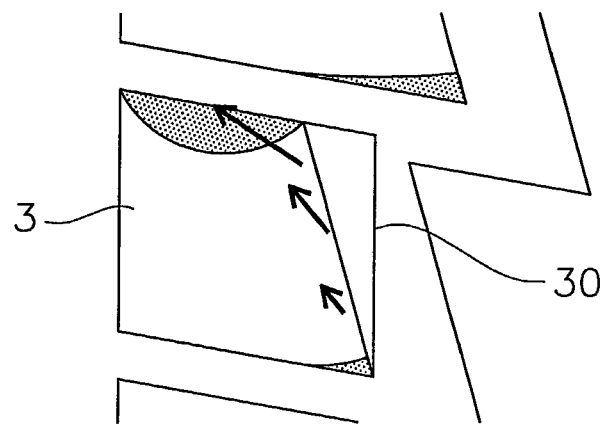
FIGS. 9(a) and 9(b) are a plan view and a side view showing a second block in accordance with a comparative example 3.
Figure 9:
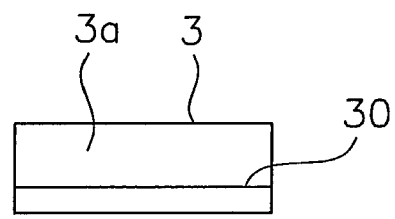
Figure 10:
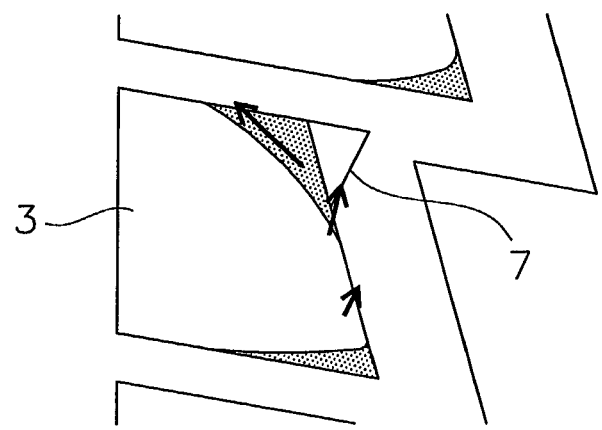
FIGS. 10(a) and 10(b) are a plan view and a side view showing a second block in accordance with a comparative example 4.
Figure 10:
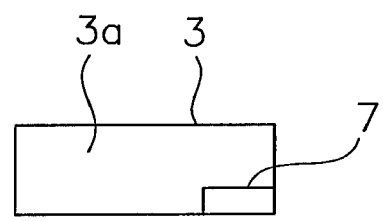
Figure 11:
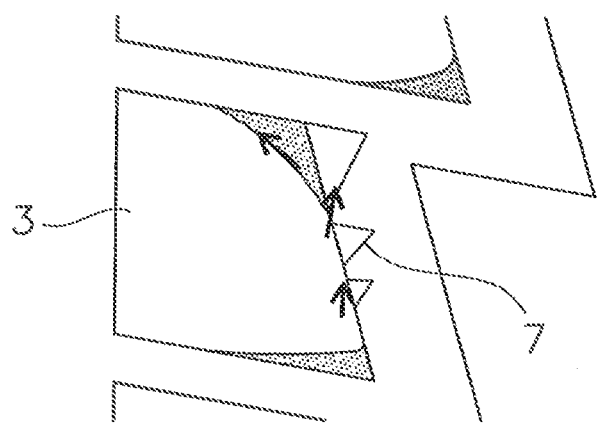
FIGS. 11(a) and 11(b) are a plan view and a side view showing a second block in accordance with a working example 1.
Figure 11:
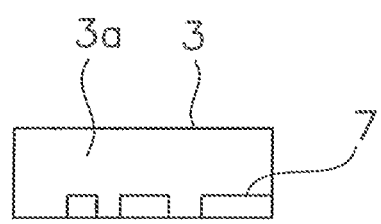
Figure 12:
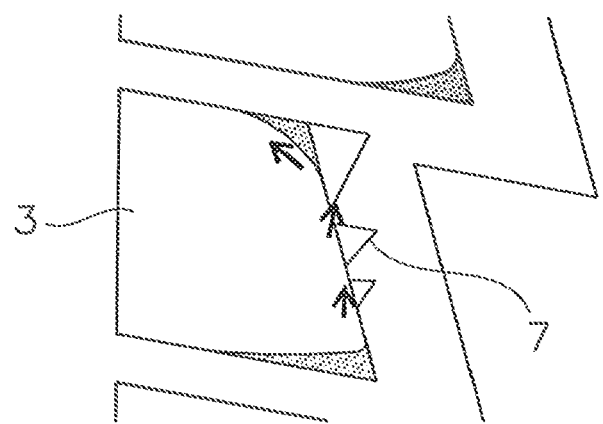
FIGS. 12(a) and 12(b) are a plan view and a side view showing a second block in accordance with a working example 2.
Figure 12:
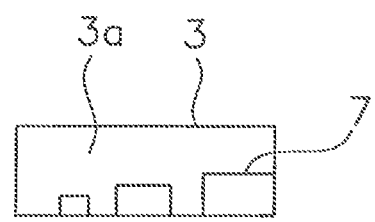
Figure 13:
FIGS. 13(a) and 13(b) are a plan view and a side view showing a second block in accordance with a working example 3.
Figure 13:
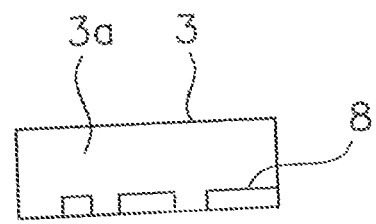
Figure 14:
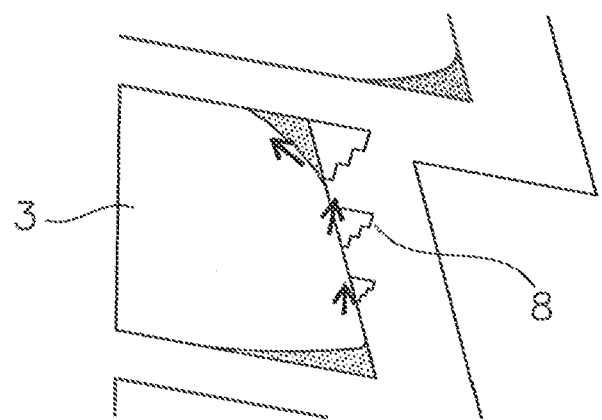
FIGS. 14(a) and 14(b) are a plan view and a side view showing a second block in accordance with a working example 4.
Figure 14:
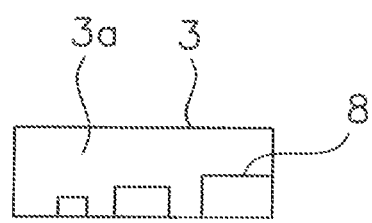

In a comparative example 1, a projection is not provided in the block 3 as shown in FIG. 7. In a comparative example 2, a pair of projections 20 are provided in the block 3 and they are connected to a land portion 21 as shown in FIG. 8. In a comparative example 3, a projection 30 is provided in a whole surface of the side wall 3*a* of the block 3 as shown in FIG. 9. In a comparative example 4, only a projection 7*a* in a trailing side is provided in the block 3 as shown in FIG. 10. In working examples 1 and 2, triangular projections 7 are provided as shown in FIGS. 11 and 12, and in working examples 3 and 4, step-like projections 8 are provided as shown in FIGS. 13 and 14.

In FIGS. 7 to 14, the same reference numerals are attached to the same structure as the structure which is described in the embodiment mentioned above. Further, in the evaluation of the heel and toe wear resistance, a region in which the wear is significant is colored by black, and a direction and a magnitude of an estimated slip are expressed by arrows. Except the shape of the projection which is provided in the side wall of the second block, the tread pattern, the tire structure and the rubber composition are in common in each of the examples. Results of the evaluation are shown in Table 1.

TABLE 1

| | comparative example 1 | comparative example 2 | comparative example 3 | comparative example 4 | working example 1 | working example 2 | working example 3 | working example 4 |
|---|---|---|---|---|---|---|---|---|
| height of projection | — | 2 mm<br>2 mm | 2 mm | 2 mm | 2 mm<br>2 mm<br>2 mm | 2 mm<br>3 mm<br>3.5 mm | 2 mm<br>2 mm<br>2 mm | 2 mm<br>3 mm<br>3.5 mm |
| heel and toe wear resistance | 13.80% | 8.70% | 7.40% | 6.50% | 3.90% | 2.90% | 3.70% | 2.70% |
| drainage performance | 100 | 95 | 94 | 99 | 98 | 97 | 98 | 97 |
| steering stability | 100 | 102 | 103 | 103 | 104 | 106 | 104 | 106 |

In the comparative example 1, the trailing side portion of the block 3 is worn in a wide range, and the heel and toe wear is significantly generated. In the comparative examples 2 and 3, the region in which the wear is significant is somewhat reduced, however, the trailing side portion of the block 3 is widely worn and the heel and toe wear is generated, and the drainage performance is deteriorated. In the comparative example 4, the region in which the wear is significant is reduced, however, the heel and toe wear cannot be sufficiently prevented.

In the working examples 1 to 4, it is possible to reduce the region in which the wear is significant in comparison with the comparative examples 1 to 4, thereby preventing the heel and toe wear, while suppressing the deterioration of the drainage performance. Further, since the slip of the block is suppressed, and the rigidity of the block is enhanced by the projection, the steering stability can be improved. In particular, in the working examples 2 and 4, since the height of the projection is differentiated together with the size in the plan view of the projection, it is possible to effectively suppress the heel and toe wear.

What is claimed is:

1. A pneumatic tire comprising:
   a plurality of main grooves which extend in a tire circumferential direction;
   a shoulder block row which is arranged in an outer side in a tire width direction of a shoulder main groove which is positioned in an outermost side in the tire width direction among the main grooves; and
   a tread surface which is provided with a plurality of main grooves and the shoulder block row,
   wherein the shoulder main groove has a plurality of circumferential components which are inclined to an inner side in the tire width direction toward a forward in a tire rotating direction, and the circumferential components which are adjacent in the tire circumferential direction are communicated with each other via a lateral groove,
   wherein the shoulder block row includes a first block which is positioned in a rear side in the tire rotating direction of the circumferential component, and a second block which has a smaller area of a top surface than the first block, and is adjacent to the first block in the tire circumferential direction with the lateral groove sandwiched there between,
   wherein a plurality of projections which are elevated from a groove bottom of the shoulder main groove and protruding out of a side wall of the second block are provided so as to be spaced at a distance in the tire circumferential direction, and a volume of the projection which is positioned in a trailing side of the second block is larger than a volume of the projection which is positioned in a leading side, and
   wherein respective heights of the plurality of projections with the groove bottom of the shoulder main groove as a reference are within 25 to 70% of a groove depth of the shoulder main groove.

2. The pneumatic tire according to claim 1, wherein the number of the projections which are provided in the side wall of the second block is three or four, and the volume of the projection becomes larger toward the trailing side of the second block.

3. The pneumatic tire according to claim 1, wherein the projection is formed such that a protruding amount from the side wall becomes larger toward the trailing side of the second block.

4. The pneumatic tire according to claim 3, wherein the projection is formed as a triangular shape or a stepped shape in a plan view.

5. The pneumatic tire according to claim 1, wherein all the projections which are provided in the side wall of the second block are settled within a region surrounded by a first imaginary straight line which connects a corner portion in the leading side of the first block to a corner portion in the trailing side of the second block facing the shoulder main groove, through the lateral groove, a second imaginary straight line which extends in the tire circumferential direction from the corner portion in the leading side of the second block facing the shoulder main groove toward a rear in the tire rotating direction, and a side wall of the second block facing the shoulder main groove.

6. The pneumatic tire according to claim 1, wherein the projection positioned in the trailing side of the second block is provided in a corner portion in the trailing side of the second block along an extending direction of the side wall of the second block facing to the lateral groove.

7. The pneumatic tire according to claim 2, wherein all the projections which are provided in the side wall of the second block are settled within a region surrounded by a first imaginary straight line which connects a corner portion in the leading side of the first block to a corner portion in the trailing side of the second block facing the shoulder main groove, through the lateral groove, a second imaginary straight line which extends in the tire circumferential direction from the corner portion in the leading side of the second block facing the shoulder main groove toward a rear in the tire rotating direction, and a side wall of the second block facing the shoulder main groove.

8. The pneumatic tire according to claim 4, wherein all the projections which are provided in the side wall of the second block are settled within a region surrounded by a first imaginary straight line which connects a corner portion in the leading side of the first block to a corner portion in the trailing side of the second block facing the shoulder main groove, through the lateral groove, a second imaginary straight line which extends in the tire circumferential direction from the corner portion in the leading side of the second block facing the shoulder main groove toward a rear in the tire rotating direction, and a side wall of the second block facing the shoulder main groove.

* * * * *